US012572209B2

(12) United States Patent
Wang et al.

(10) Patent No.: US 12,572,209 B2
(45) Date of Patent: Mar. 10, 2026

(54) TACTILE-FEEDBACK MODULE AND DRIVING METHOD THEREOF, AND TACTILE-FEEDBACK DEVICE

(71) Applicants:Beijing BOE Technology Development Co., Ltd., Beijing (CN); BOE Technology Group Co., Ltd., Beijing (CN)

(72) Inventors: Shuai Wang, Beijing (CN); Dexing Qi, Beijing (CN); Yongchun Tao, Beijing (CN); Jijing Huang, Beijing (CN); Yingzi Wang, Beijing (CN); Dongsheng Huang, Beijing (CN); Li Zhou, Beijing (CN); Xiaoguang Xu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 48 days.

(21) Appl. No.: 18/699,967

(22) PCT Filed: Jul. 24, 2023

(86) PCT No.: PCT/CN2023/108877
§ 371 (c)(1),
(2) Date: Apr. 10, 2024

(87) PCT Pub. No.: WO2025/020037
PCT Pub. Date: Jan. 30, 2025

(65) Prior Publication Data
US 2025/0238081 A1 Jul. 24, 2025

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01); *G06F 2203/04102* (2013.01)

(58) Field of Classification Search
CPC . G06F 3/016; G06F 3/041; G06F 2203/04102
See application file for complete search history.

(56) References Cited

U.S. PATENT DOCUMENTS 10,504,342 B1 * 12/2019 Khoshkava .............. G08B 6/00
2007/0102270 A1 5/2007 Takashima et al.
(Continued)

FOREIGN PATENT DOCUMENTS

CN 108628443 A 10/2018
CN 111112037 A 5/2020
(Continued)

*Primary Examiner* — Temesghen Ghebretinsae
*Assistant Examiner* — Sosina Abebe
(74) *Attorney, Agent, or Firm* — WHDA, LLP

(57) ABSTRACT

A tactile-feedback module, a driving method thereof and a tactile-feedback device are provided, which relate to the technical field of electronics. The tactile-feedback module includes: a touch display panel, including a display surface; a cover plate disposed at one side of the touch display panel and adjacent to the display surface; and a plurality of actuators disposed at a same side of the cover plate as the touch display panel, wherein the actuators are configured to, in response to a driving signal, drive the cover plate to vibrate, to generate tactile feedback at a surface of the cover plate away from the touch display panel; wherein the actuators are adjacent to an edge of the touch display panel.

18 Claims, 10 Drawing Sheets

(56) References Cited

U.S. PATENT DOCUMENTS

| | | | | |
|---|---|---|---|---|
| 2010/0156818 A1* | 6/2010 | Burrough | ............ | G06F 3/04883 |
| | | | | 345/173 |
| 2010/0265191 A1* | 10/2010 | Mui | .................... | G06F 3/04886 |
| | | | | 345/173 |
| 2017/0075444 A1* | 3/2017 | Nade | ................... | H04M 1/0269 |
| 2020/0142492 A1 | 5/2020 | Alghooneh et al. | | |
| 2021/0041954 A1 | 2/2021 | Oh et al. | | |
| 2024/0019936 A1 | 1/2024 | Ham | | |
| 2024/0056712 A1 | 2/2024 | Nam et al. | | |

FOREIGN PATENT DOCUMENTS

| | | | | | | |
|---|---|---|---|---|---|---|
| CN | 111133404 | A | | 5/2020 | | |
| CN | 111860059 | A | | 10/2020 | | |
| CN | 112346592 | A | | 2/2021 | | |
| CN | 113035907 | A | | 6/2021 | | |
| CN | 113220166 | A | | 8/2021 | | |
| CN | 114428551 | A | | 5/2022 | | |
| CN | 114442850 | A | * | 5/2022 | ........... | G06F 3/0412 |
| CN | 114615606 | A | | 6/2022 | | |
| CN | 116382511 | A | | 7/2023 | | |
| JP | 2005258666 | A | * | 9/2005 | ............ | G06F 3/016 |
| KR | 20210056850 | A | | 5/2021 | | |

* cited by examiner

TACTILE-FEEDBACK MODULE AND DRIVING METHOD THEREOF, AND TACTILE-FEEDBACK DEVICE

TECHNICAL FIELD

The present disclosure relates to the technical field of electronics and, more particularly, to a tactile-feedback module, a driving method thereof and a tactile-feedback device.

BACKGROUND

Tactile feedback is an advanced technique in the fields of virtual reality and human-machine interaction, and the multimedia terminals applying the technique of tactile feedback such as smartphones and tablet personal computers have a good prospect of application in the fields such as education, entertainment and medical treatment. With the vigorous development of new-energy vehicles, large-sized onboard display screens have already become a trend, and more and more interaction components such as physical buttons and knobs have begun being implemented on touch display screens.

SUMMARY

The present disclosure provides a tactile-feedback module, wherein the tactile-feedback module includes:

a touch display panel, including a display surface;

a cover plate disposed at one side of the touch display panel and adjacent to the display surface; and a plurality of actuators disposed at a same side of the cover plate as the touch display panel, wherein the actuators are configured to, in response to a driving signal, drive the cover plate to vibrate, to generate tactile feedback at a surface of the cover plate away from the touch display panel; and the actuators are adjacent to an edge of the touch display panel.

In some embodiments, at least one of the plurality of actuators is located at one side of the touch display panel away from the cover plate, and an orthographic projection on the cover plate of the at least one of the plurality of actuators is located within an area of an orthographic projection on the cover plate of the touch display panel.

In some embodiments, at least one of the plurality of actuators is located at one side of the cover plate close to the touch display panel, and an orthographic projection on the cover plate of the at least one of the plurality of actuators is located outside an area of an orthographic projection on the cover plate of the touch display panel and inside an edge of the cover plate.

In some embodiments, the plurality of actuators are adjacent to a second edge of the touch display panel, and the plurality of actuators adjacent to the second edge are arranged in a direction parallel to the second edge.

In some embodiments, the plurality of actuators are divided into at least one actuator group, each actuator group is divided into two actuator units, and each of the actuator units includes at least one of the plurality of actuators; and the two actuator units located in a same actuator group are close to two different edges that are opposite to each other of the touch display panel, respectively.

In some embodiments, the two actuator units located in the same actuator group are arranged symmetrically, and include actuators of equal quantities.

In some embodiments, the at least one actuator group includes:

a first actuator group being configured to generate a vibration at a first frequency, wherein the actuator units located in the first actuator group are first actuator units, two first actuator units located in a same first actuator group are adjacent to two third edges of the touch display panel, and the two third edges are opposite to each other in a first direction; and/or a second actuator group being configured to generate a vibration at a second frequency, wherein the actuator units located in the second actuator group are second actuator units, two second actuator units located in a same second actuator group are adjacent to two fourth edges of the touch display panel, and the two fourth edges are opposite to each other in a second direction;

wherein the first frequency is greater than the second frequency, and the second direction and the first direction are parallel to each other or intersected with each other.

In some embodiments, the second direction and the first direction are parallel to each other, and the first actuator units are located at one side of the second actuator units close to an edge of the cover plate.

In some embodiments, the plurality of actuators located in each of the first actuator units are arranged equidistantly with a first spacing in a direction parallel to the third edges; and the plurality of actuators located in each of the second actuator units are arranged equidistantly with a second spacing in a direction parallel to the fourth edges;

wherein the first spacing is less than or equal to the second spacing.

In some embodiments, the first spacing is less than or equal to a first wavelength, wherein the first wavelength refers to a wavelength of a mechanical wave formed by vibration that the actuators located in the first actuator units drive the cover plate to perform.

In some embodiments, a dimension in the first direction of each of the actuators is greater than or equal to one eighth of a first wavelength, and less than or equal to a half of the first wavelength, wherein the first wavelength refers to a wavelength of a mechanical wave formed by vibration that the actuators located in the first actuator units drive the cover plate to perform.

In some embodiments, the actuators are located at positions of wave peaks or wave troughs of a first mechanical wave, wherein the first mechanical wave refers to a mechanical wave formed by vibration that the actuators located in the first actuator units drive the cover plate to perform.

In some embodiments, the cover plate includes two fifth edges adjacent to the two third edges, and two sixth edges adjacent to the two fourth edges; and the two fifth edges are parallel to each other, and the two sixth edges are parallel to each other or intersected with each other.

In some embodiments, the touch display panel includes a flexible display panel, and a display surface of the flexible display panel is a curved surface, and the third edges are perpendicular to a curved are line of the curved surface.

In some embodiments, the touch display panel includes a pair of longer sides and a pair of shorter sides, and the two fourth edges are the pair of longer sides of the touch display panel.

In some embodiments, the touch display panel includes a flexible display panel, and a display surface of the flexible display panel is a curved surface, and the curved surface has a curved arc line with a curving radius of R; and a dimension in a direction of the curved are line of each of the actuators is greater than or equal to R/60, and less than or equal to R/20.

In some embodiments, the touch display panel includes a flexible display panel; and a display surface of the flexible display panel is a plane, and a surface of the cover plate close to the flexible display panel is a plane parallel to the display surface; or a display surface of the flexible display panel is a curved surface, and a surface of the cover plate close to the flexible display panel is a curved surface parallel to the display surface.

In some embodiments, the actuators include at least one of a lead zirconate titanate (PZT) piezoelectric thin film, a monolithic piezoelectric ceramic, a stacked piezoelectric ceramic, a cymbal piezoelectric ceramic, a monolithic polyvinylidene fluoride film, a stacked polyvinylidene fluoride film, a cymbal polyvinylidene fluoride film and a linear motor.

A tactile-feedback device is provided by the present disclosure, wherein the tactile-feedback device includes:

the tactile-feedback module according to any one of the above embodiments; and a driving component, wherein the driving component is connected to the touch display panel and the actuators, and is configured to drive the touch display panel to display a frame, and according to touch information on the touch display panel of a touch body, output the driving signal to the actuators, so that the actuators, in response to the driving signal, drive the cover plate to vibrate, to generate the tactile feedback at the surface of the cover plate away from the touch display panel, wherein the touch information includes at least one of a touch position, a touch time and a touch action.

In some embodiments, the plurality of actuators are connected in parallel to the driving component, so that the driving component is capable of independently driving each of the actuators.

A driving method of a tactile-feedback module is provided by the present disclosure, applied to the tactile-feedback module according to some of the above embodiments, wherein the driving method includes:

applying driving signals of a same phase to actuators of the two second actuator units located in the same second actuator group, so that the actuators of the two second actuator units located in the same second actuator group generate vibration waveforms of the same phase; or applying driving signals of opposite phases to actuators of the two second actuator units located in the same second actuator group, so that the actuators of the two second actuator units located in the same second actuator group generate vibration waveforms of opposite phases.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work. It should be noted that the scales in the drawings are merely illustrative and do not indicate the actual scales.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
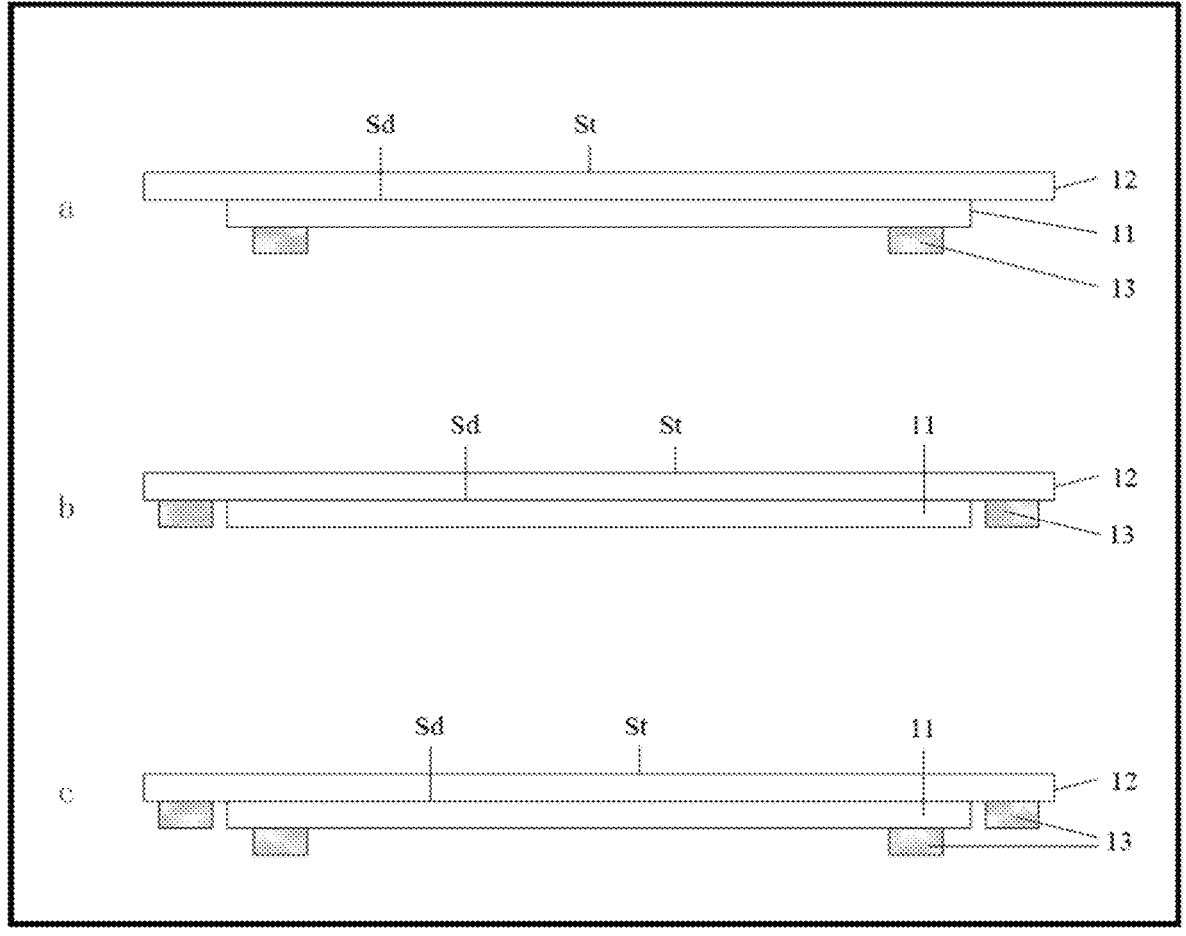
FIG. 1 exemplarily shows schematic sectional structural diagrams of several tactile-feedback modules.

Referring to FIG. 1, FIG. 1 exemplarily shows schematic sectional structural diagrams of several embodiments of the tactile-feedback module. Referring to FIG. 2 to FIG. 7, FIG. 2 to FIG. 7 exemplarily show schematic planar structural diagrams of several embodiments of the tactile-feedback module.

A tactile-feedback module is provided by the present disclosure. As shown in FIG. 1, the tactile-feedback module includes: a touch display panel 11 including a display surface Sd; a cover plate 12 disposed at one side of the touch display panel 11 and adjacent to the display surface Sd; and a plurality of actuators 13 disposed at a same side of the cover plate 12 as the touch display panel 11, wherein the actuators 13 are configured to, in response to a driving signal, drive the cover plate 12 to vibrate, to generate tactile feedback at a surface of the cover plate 12 away from the touch display panel 11, i.e., the touch surface St.

Figure 12:
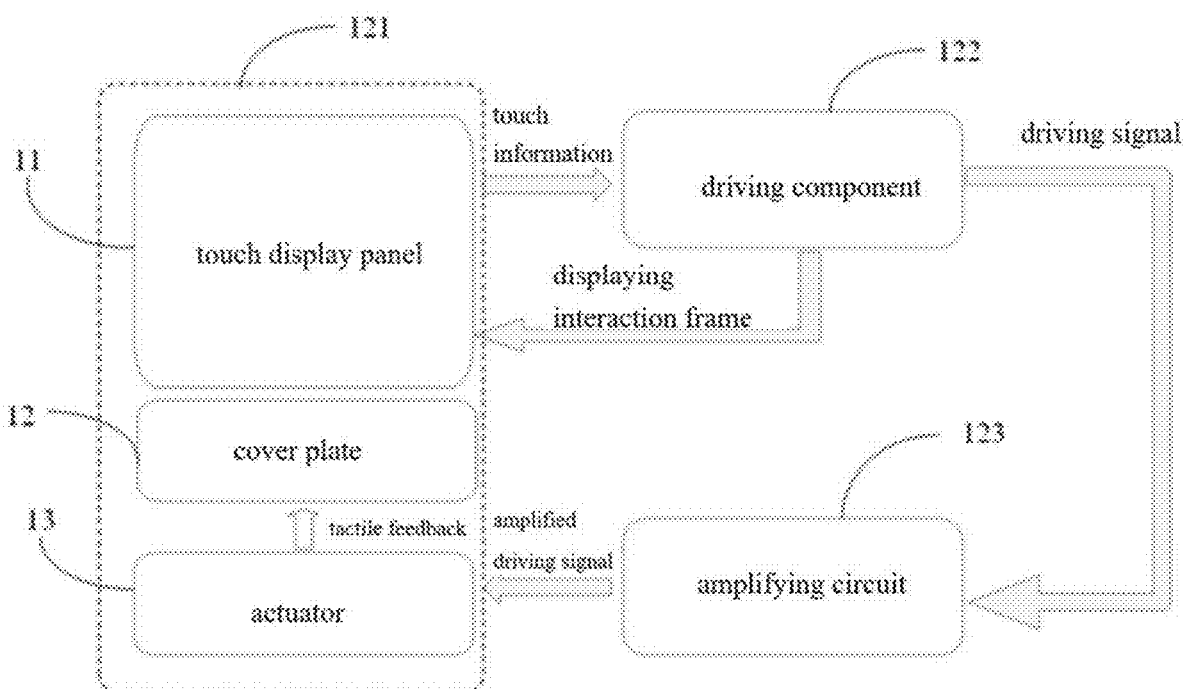
FIG. 12 exemplarily shows a schematic structural diagram of a tactile-feedback device.

Exemplarily, as shown in FIG. 12, the driving component 122 of the tactile-feedback module may drive the touch display panel 11 to display an interaction interface, and according to touch information on the touch display panel 11 of a touch body, generate a driving signal and output the driving signal to the actuators 13. The actuators 13, in response to the driving signal, drive the cover plate 12 to vibrate, so that the tactile feedback can be formed on the touch surface St. The touch information includes at least one of a touch position, a touch time and a touch action. The touch body may be an object such as a finger or a touch pen.

Exemplarily, the actuators 13 may drive the cover plate 12, and may also drive the cover plate 12 and the touch display panel 11 to vibrate together.

By using the tactile-feedback module according to the present disclosure, in cooperation with the waveform of the driving signal, an effect of tactile feedback with rich variations on the vibration and the texture can be realized, the experience in human-machine interaction and the driving safety are enhanced. The tactile-feedback module according to the present disclosure may be applied in an onboard display system; for example, it may be applied at the positions such as the onboard central controller, the handrail screen, the copilot entertainment screen and so on.

In addition, by disposing the actuators 13 at the back of the cover plate 12, not only can the uniformity of the touch sense on the touch surface St be improved, but also the aesthetics of the tactile-feedback module can be enhanced.

As shown in any one of FIGS. 1 to 7, the actuators 13 are adjacent to the edge of the touch display panel 11. In other words, the orthographic projections of the actuators 13 on the cover plate 12 are adjacent to the edge of the orthographic projection of the touch display panel 11 on the cover plate 12.

By disposing the actuators 13 at the position adjacent to the edge of the touch display panel 11, the uniformity of the tactile sense within the touch display region of the tactile-feedback module can be further improved.

In the present disclosure, the cover plate 12 serves to encapsulate and protect the touch display panel 11. The cover plate 12 may, for example, be a transparent glass cover plate.

Exemplarily, the touch display panel 11 may include a touch circuit and a display panel. The touch circuit may be integrated inside the display panel, and may also be disposed independently from the display panel; for example, the touch circuit may be adhered between the display panel and the cover plate 12. The touch circuit is configured to detect the touch information on the touch display panel 11 of the touch body.

Exemplarily, as shown in any one of FIGS. 2 to 7, a shape of the touch display panel 11 is rectangular, which is not limited in the present disclosure.

Figure 2:
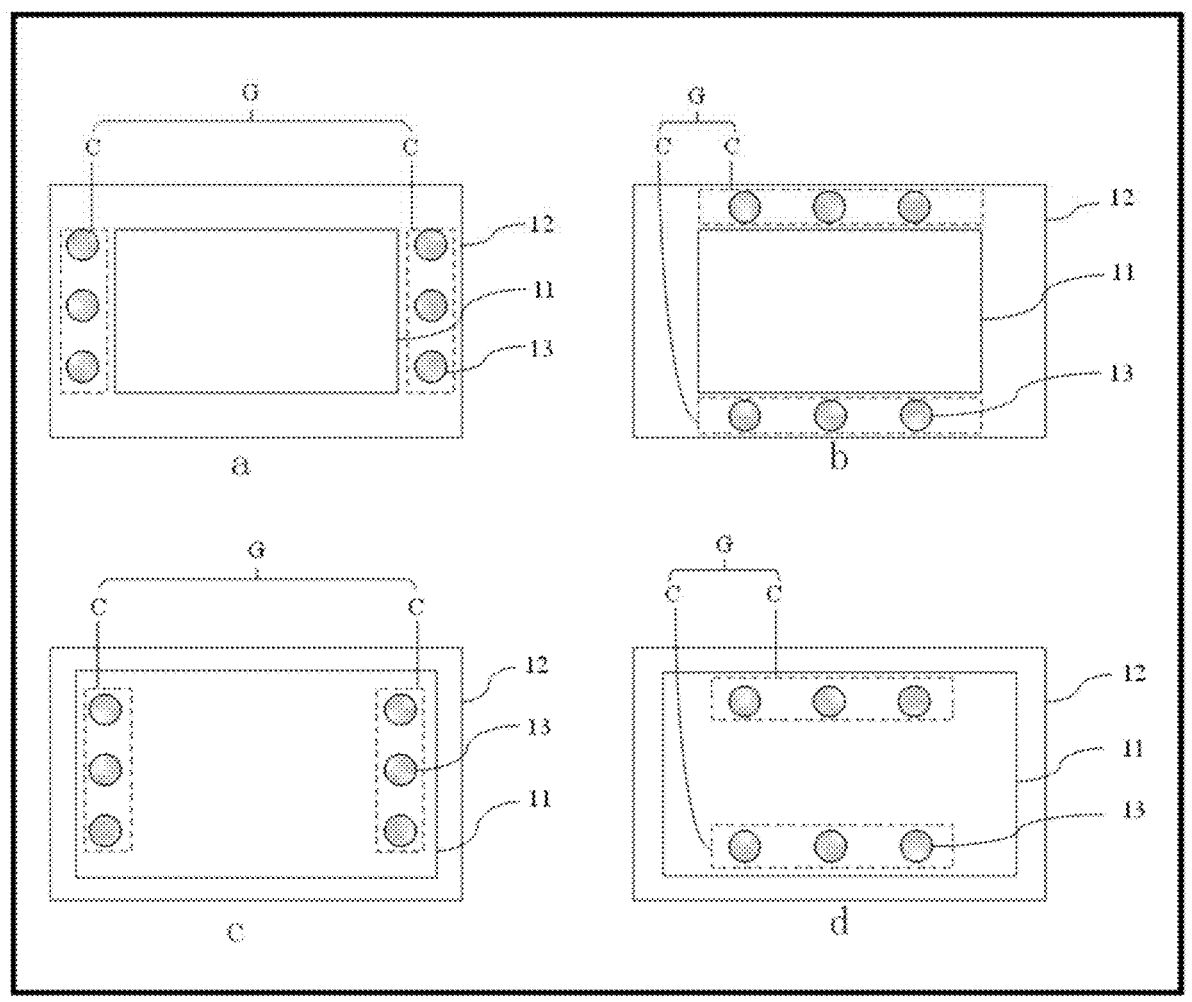
FIG. 2 to FIG. 7 exemplarily show schematic planar structural diagrams of several tactile-feedback modules.
Figure 3:
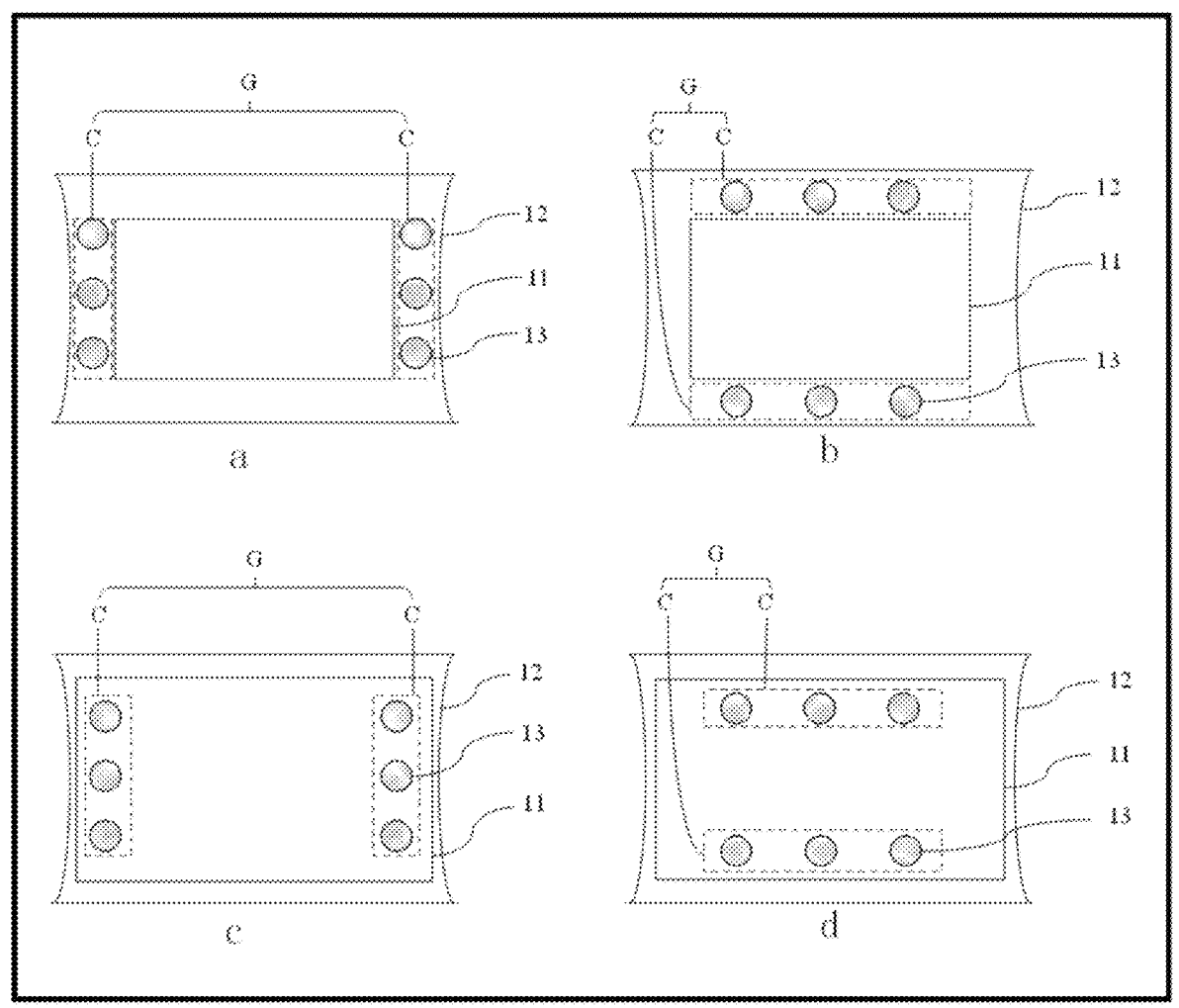
Figure 4:
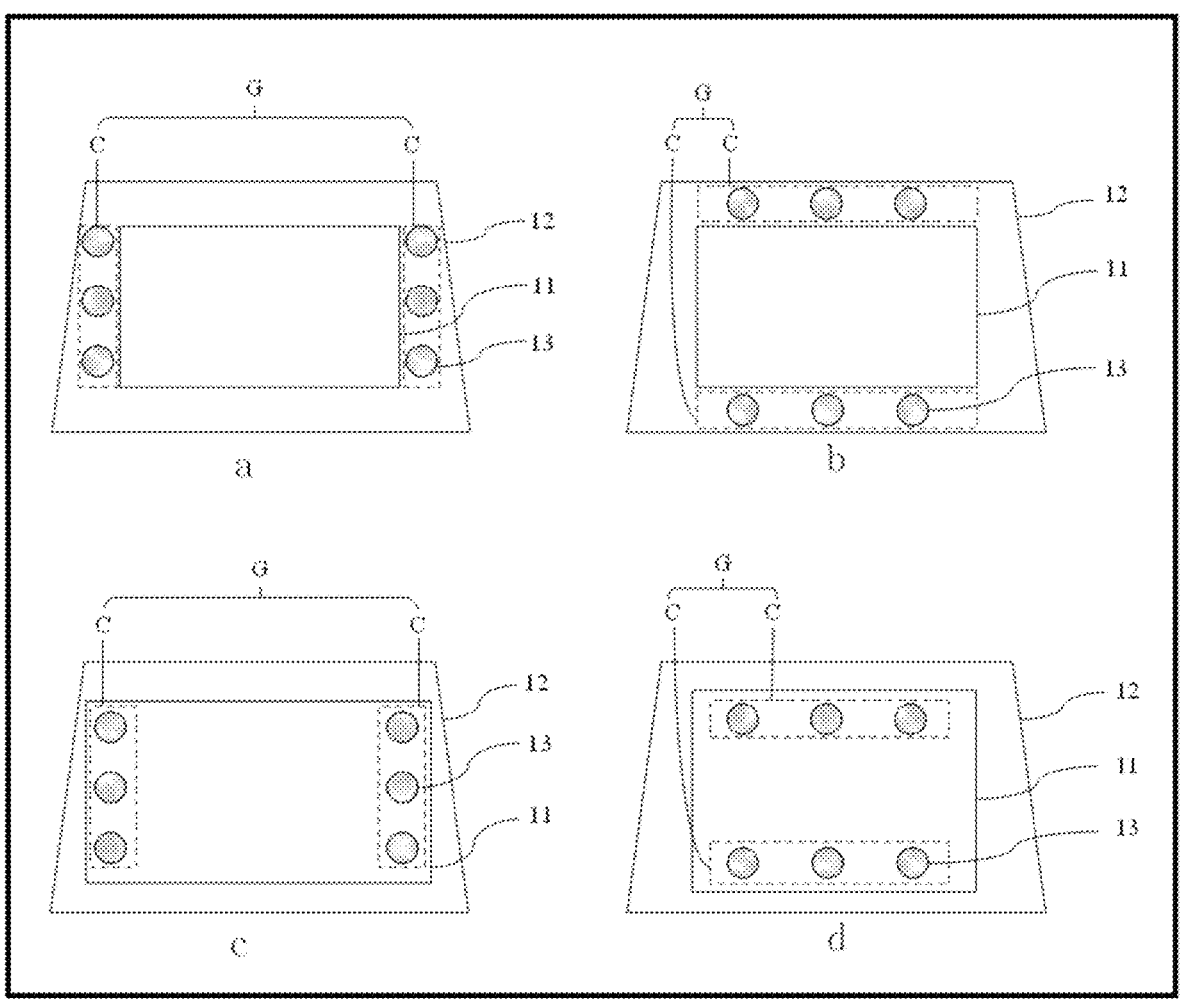
Figure 5:
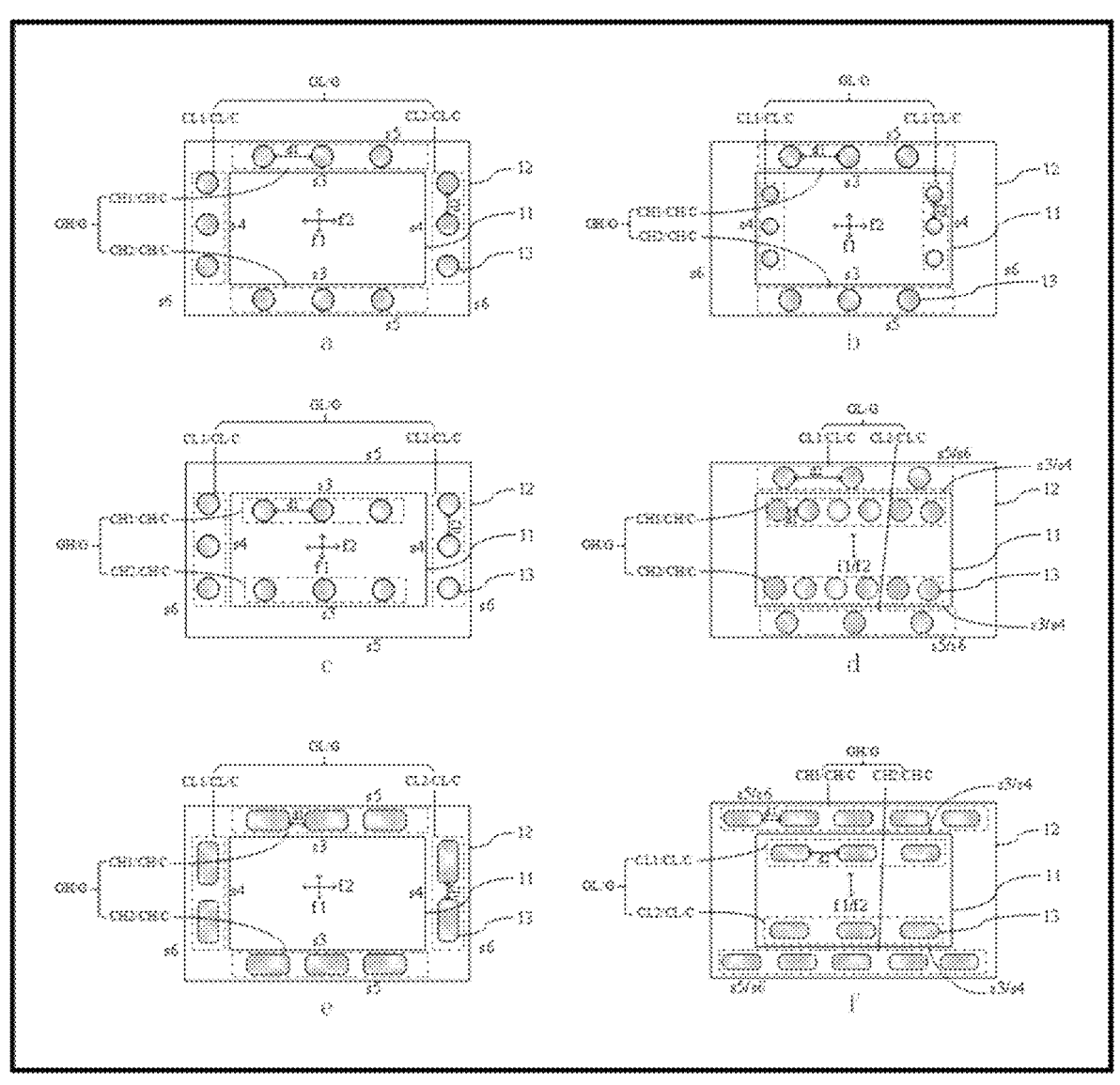
Figure 6:
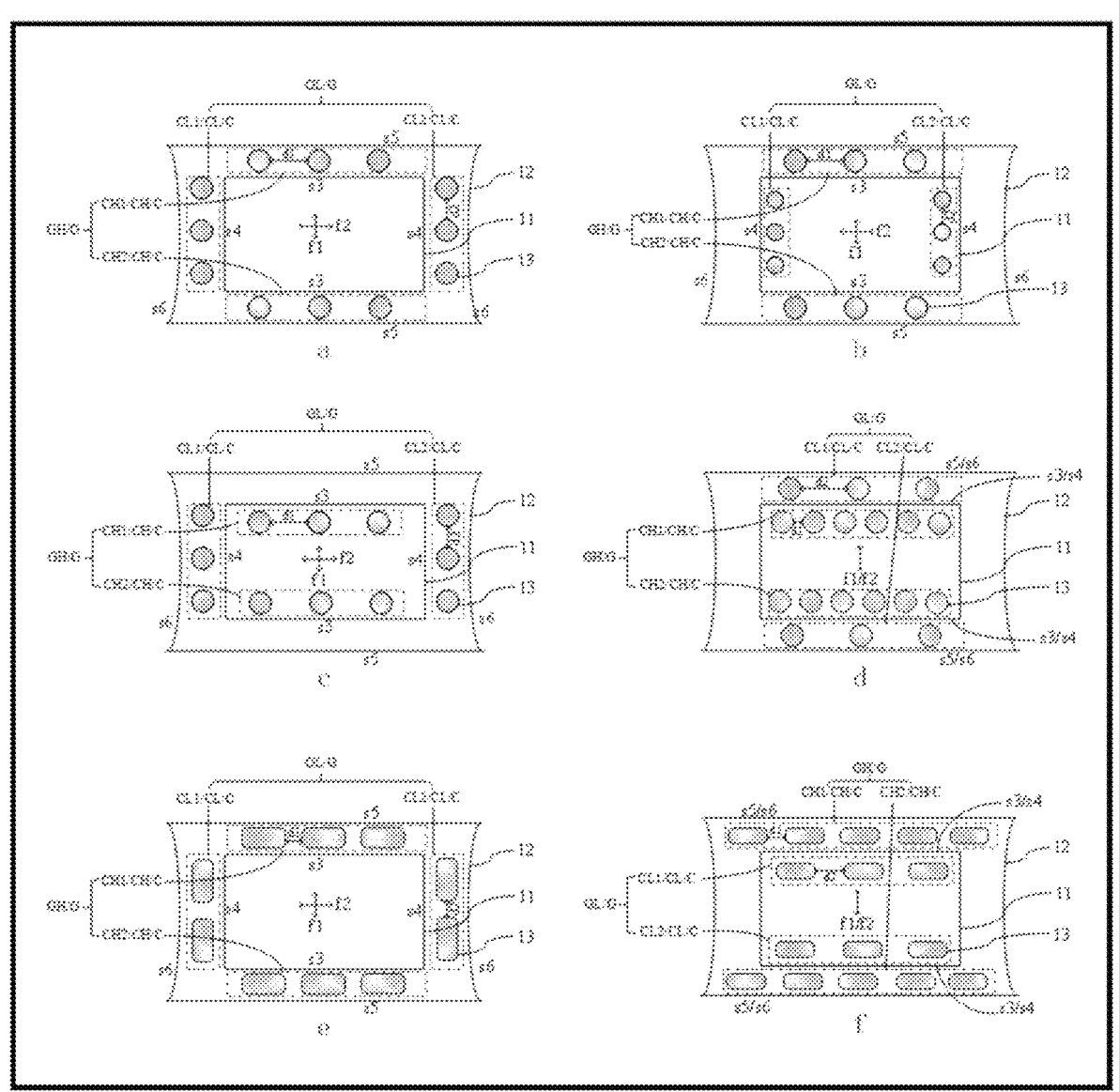
Figure 7:
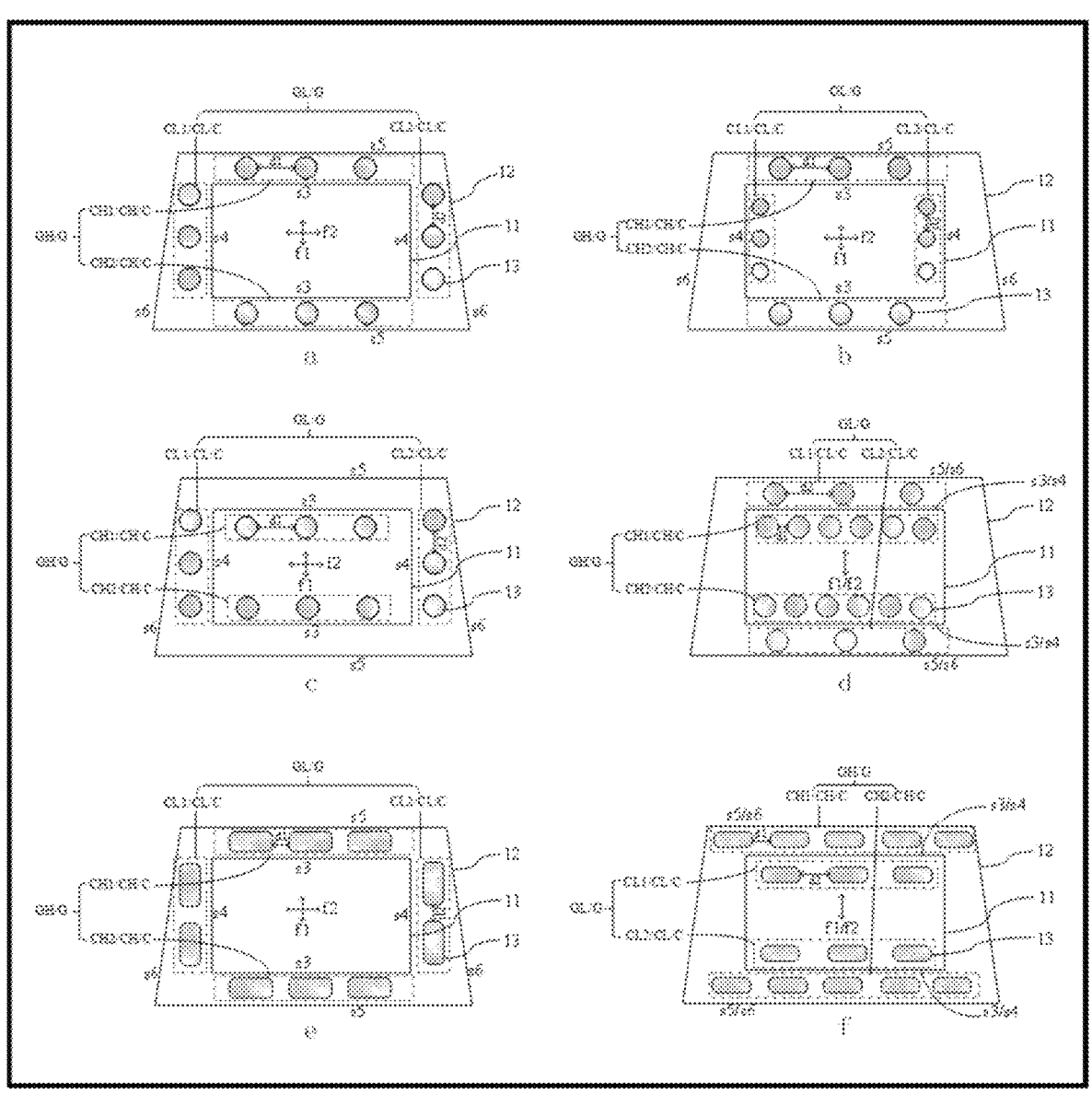

Exemplarily, a shape of the cover plate 12 may be a regular shape such as a rectangle (as shown in FIG. 2 or 5) and a trapezoid (as shown in FIG. 4 or 7), and may also be an irregular shape. As shown in FIG. 3 or FIG. 6, the shape of the cover plate 12 is a hyperbolic shape, wherein the cover plate 12 of the hyperbolic shape includes two side edges parallel to each other (the upper side edge and the lower side edge of the cover plate 12 shown in the figures), and further includes two side edges of a hyperbolic shape (the left side edge and the right side edge of the cover plate 12 shown in the figures).

In some embodiments, as shown in FIG. a in FIG. 1, at least one of the plurality of actuators 13 is located at one side of the touch display panel 11 away from the cover plate 12, and the orthographic projection on the cover plate 12 of the at least one of the plurality of actuators 13 is located within an area of an orthographic projection on the cover plate 12 of the touch display panel 11.

In the present embodiment, because the actuators 13 are located at a back of the touch display panel 11, and do not additionally occupy the room of the border frame, a narrow border frame is facilitated to be realized.

Exemplarily, a supporting layer (not shown in the figures) may be disposed between the touch display panel 11 and the actuators 13, and the supporting layer serves to protect, fix and support the touch display panel 11. The supporting layer may, for example, be an aluminium film, a copper film and so on.

In some embodiments, as shown in FIG. b in FIG. 1, at least one of the plurality of actuators 13 is located at the side of the cover plate 12 close to the touch display panel 11, and the orthographic projection on the cover plate 12 of at least one of the plurality of actuators 13 is located outside the area of the orthographic projection on the cover plate 12 of the touch display panel 11 and inside the edge of the cover plate 12. In other words, in the orthographic projections on the cover plate 12, at least one of the plurality of actuators 13 is located between the edge of the touch display panel 11 and the edge of the cover plate 12.

In the present embodiment, because the actuators 13 and the touch display panel 11 are arranged in a same layer at the back of the cover plate 12, the influence on the thickness of the tactile-feedback module is low. Therefore, it is beneficial to make the tactile-feedback module thin and light.

In some embodiments, as shown in FIG. c in FIG. 1, some of the actuators 13 are located at the side of the touch display panel 11 away from the cover plate 12, and the orthographic projections on the cover plate 12 of this part of the actuators 13 are located within the area of the orthographic projection of the touch display panel 11 on the cover plate 12. The other of the actuators 13 are located at the side of the cover plate 12 close to the touch display panel 11, and the orthographic projections on the cover plate 12 of this part of the actuators 13 are located outside the area of the orthographic projection of the touch display panel 11 on the cover plate 12 and within the edge of the cover plate 12.

In some embodiments, as shown in any one of FIGS. 2 to 7, the actuators 13 are located between a first edge of the touch display panel 11 and the edge of the cover plate 12, and, in the direction along the first edge, the actuators 13 located between the first edge and the edge of the cover plate 12 are located between two endpoints of the first edge.

The first edge may be any one of the edges of the touch display panel 11. For example, as shown in any one of FIGS. 2 to 7, the touch display panel 11 is a quadrangle, and the first edge may be any one of the four side edges of the quadrangle.

Exemplarily, as shown in any one of FIGS. 2 to 7, the region where the actuator 13 located between a left-side edge of the touch display panel 11 and the edge of the cover plate 12 is disposed in a direction along the left-side edge of the touch display panel 11 is located between the upper endpoint and the lower endpoint of the left-side edge of the touch display panel 11.

Exemplarily, as shown in any one of FIGS. 2 to 7, the region where the actuator 13 located between a right-side edge of the touch display panel 11 and the edge of the cover plate 12 is disposed in a direction along the right-side edge of the touch display panel 11 is located between the upper endpoint and the lower endpoint of the right-side edge of the touch display panel 11.

Exemplarily, as shown in any one of FIGS. 2 to 7, the region where the actuator 13 located between an upper-side edge of the touch display panel 11 and the edge of the cover plate 12 is disposed in the direction along the upper-side edge of the touch display panel 11 is located between the left endpoint and the right endpoint of the upper-side edge of the touch display panel 11.

Exemplarily, as shown in any one of FIGS. 2 to 7, the region where the actuator 13 located between a lower-side edge of the touch display panel 11 and the edge of the cover plate 12 is disposed in a direction along the lower-side edge of the touch display panel 11 is located between the left endpoint and the right endpoint of the lower-side edge of the touch display panel 11.

In the present embodiment, it is beneficial to increase the intensity of the tactile sense within the touch display region of the tactile-feedback module.

It should be noted that, as shown in FIG. f in any one of FIGS. 5 to 7, the actuator 13 located between the first edge of the touch display panel 11 and the edge of the cover plate 12 also exceeds the region between the two endpoints of the first edge, which is not limited in the present disclosure.

In some embodiments, as shown in any one of FIGS. 2 to 7, the plurality of actuators 13 are adjacent to a second edge of the touch display panel 11, and the plurality of actuators 13 adjacent to the second edge are arranged in the direction parallel to the second edge.

The second edge may be any one of the edges of the touch display panel 11. For example, the touch display panel 11 is a quadrangle, and the second edge may be any one of the four side edges of the quadrangle.

Exemplarily, the plurality of actuators 13 adjacent to the second edge may be arranged equidistantly in the direction parallel to the second edge, thereby the uniformity of the tactile sense within the touch display region of the tactile-feedback module may be further improved.

In some embodiments, as shown in any one of FIGS. 2 to 7, the plurality of actuators 13 are divided into at least one actuator group G, each actuator group G is divided into two actuator units C, and each of the actuator units C includes at least one of the plurality of actuators 13. The two actuator units C located in a same actuator group G are close to two different edges that are opposite to each other of the touch display panel 11, respectively.

Exemplarily, as shown in any one of FIGS. 2 to 7, the touch display panel 11 is rectangular. One of the actuator units C located in a same actuator group G is close to the upper side edge of the rectangle, and the other actuator unit C is close to the lower side edge of the rectangle. Alternatively, one of the actuator units C located in the same actuator group G is closer to the left side edge of the rectangle, and the other actuator unit C is closer to the right side edge of the rectangle.

By configuring that the two actuator units C in the same actuator group G are close to the different edges, and the edges that the two actuator units C are closer to are opposite to each other, the uniformity of the tactile sense within the touch display region of the tactile-feedback module can be further improved.

Each of the actuator units C may include one or more actuators 13. Exemplarily, as shown in FIGS. 2 to 7, the actuator unit C may include two, three, four, five or six actuators 13.

In some embodiments, as shown in any one of FIGS. 2 to 7, the two actuator units C located in the same actuator group G are arranged symmetrically, and include actuators 13 of equal quantities.

In the present embodiment, by arranging the two actuator units C in the same actuator group G symmetrically, the uniformity of the tactile sense within the touch display region of the tactile-feedback module can be further improved.

Exemplarily, as shown in any one of FIGS. 2 to 7, the two actuator units C in the same actuator group G may be axially symmetric, wherein a symmetrical axis is, for example, the geometrical symmetrical axis of the display surface Sd. For example, as shown in any one of FIGS. 2 to 7, the shape of the display surface Sd is rectangular, and the symmetrical axis of the two actuator units C in the same actuator group G is the geometrical symmetrical axis of the rectangle.

Exemplarily, as shown in any one of FIGS. 2 to 7, the two actuator units C in the same actuator group G may be centrosymmetric, wherein the symmetrical center is, for example, the geometric center of the display surface Sd. For example, as shown in any one of FIGS. 2 to 7, the shape of the display surface Sd is rectangular, and the symmetrical center of the two actuator units C in the same actuator group G is the geometric center of the rectangle.

In some embodiments, as shown in any one of FIGS. 5 to 7, the at least one actuator group G includes: a first actuator group GH being configured to generate a vibration at a first frequency, wherein the actuator units C located in the first actuator group GH are first actuator units CH, two first actuator units CH located in the same first actuator group GH are adjacent to two third edges s3 of the touch display panel 11, and the two third edges s3 are opposite to each other in a first direction f1.

Exemplarily, the driving signal at the first frequency may be applied to the actuators 13 in the first actuator units CH, wherein, for example, the first frequency is greater than or equal to 20 kHz, so as to regulate the friction at the vibrating surface, thereby the variation of the details of the texture with the changing surface roughness is realized.

Exemplarily, as shown in any one of FIGS. 5 to 7, the shape of the display surface Sd is rectangular. If the first direction f1 is parallel to the shorter sides of the rectangle, then the two third edges s3 are a pair of longer sides of the rectangle. If the first direction f1 is parallel to the longer sides of the rectangle, then the two third edges s3 are a pair of shorter sides of the rectangle.

In some embodiments, as shown in any one of FIGS. 5 to 7, the at least one actuator group G includes: a second actuator group GL being configured to generate a vibration at a second frequency, wherein the actuator units C located in the second actuator group GL are second actuator units CL, the two second actuator units CL located in a same second actuator group GL are adjacent to two fourth edges s4 of the touch display panel 11, and the two fourth edges s4 are opposite to each other in a second direction f2. The first frequency is greater than the second frequency.

Exemplarily, the driving signal at the second frequency may be applied to the actuators 13 in the second actuator units CL, wherein, for example, the second frequency may be greater than or equal to 100 Hz, and less than or equal to 500 Hz, so as to realize the effect of low-frequency vibration feedback.

Exemplarily, as shown in any one of FIGS. 5 to 7, the shape of the display surface Sd is rectangular. If the second direction f2 is parallel to the shorter sides of the rectangle, then the two fourth edges s4 are a pair of longer sides of the rectangle. If the second direction f2 is parallel to the longer sides of the rectangle, then the two fourth edges s4 are a pair of shorter sides of the rectangle.

It should be noted that, in FIGS. 2 to 4, the tactile-feedback module includes one actuator group G. In order to enable that actuator group G to realize low-frequency vibration and high-frequency vibration, time division multiplexing may be performed to the actuator group G. For example, at the stage of low-frequency vibration, a low-frequency driving signal at the second frequency is applied to the actuator group G, to realize the effect of low-frequency vibration feedback. At the stage of high-frequency vibration, a high-frequency driving signal at the first frequency is applied to the same actuator group G, the regulation on the surface friction is realized.

Figure 11:
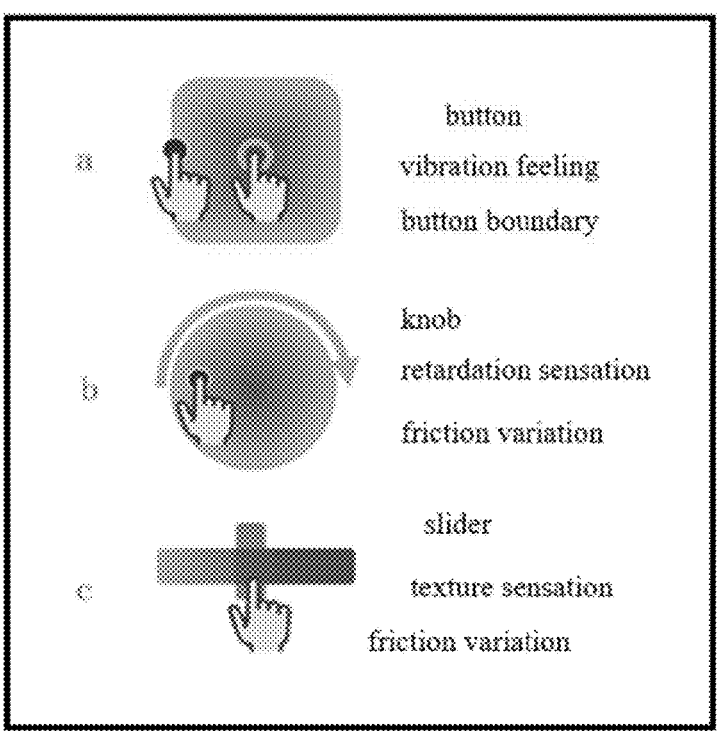
FIG. 11 exemplarily shows schematic diagrams of the effects of some types of tactile feedback.

In some embodiments, as shown in any one of FIGS. 5 to 7, the at least one actuator group G includes: a first actuator group GH and a second actuator group GL. In this way, by disposing the first actuator group GH and the second actuator group GL in the tactile-feedback module, low-frequency vibration and high-frequency vibration can be generated, at a same time, without time division multiplexing to the actuator groups G, thereby the effect of the tactile feedback of mixed high frequency and low frequency is realized. The effect of the tactile feedback may include: button feedback shown in FIG. a in FIG. 11 including button vibration and button boundary-texture reproduction; knob retardation sensation shown in FIG. b in FIG. 11 realized by the variation of the friction; and texture sensation generated by the variation in the friction of the slider shown in FIG. c in FIG. 11.

In some embodiments, as shown in FIG. d or FIG. f in any one of FIGS. 5 to 7, the second direction f2 and the first direction f1 are parallel to each other. In the present embodiment, the third edges s3 and the fourth edges s4 are the same.

Exemplarily, the shape of the display surface Sd is rectangular. As shown in FIG. d or FIG. f in any one of FIGS. 5 to 7, both of the first direction f1 and the second direction 12 are parallel to the shorter sides of the rectangle, and the two third edges s3 and the two fourth edges s4 are the pair of longer sides of the rectangle. Certainly, both of the first direction f1 and the second direction f2 may be parallel to the longer sides of the rectangle, and both of the two third edges s3 and the two fourth edges s4 are the pair of shorter sides of the rectangle.

In some embodiments, as shown in FIG. f in any one of FIGS. 5 to 7, the second direction f2 and the first direction f1 are parallel to each other, and the first actuator units CH are located at the side of the second actuator units CL close to the edge of the cover plate 12. In this way, by disposing the first actuator units CH at a periphery of the second actuator units CL, the tactile sense can be further improved.

Exemplarily, as shown in FIG. f in any one of FIGS. 5 to 7, the second actuator units CL are located within the area of the touch display panel 11, and the first actuator units CH are located outside the area of the touch display panel 11 and within the edge of the cover plate 12; in other words, the first actuator units CH are located between the second actuator units CL and the edge of the cover plate 12.

It should be noted that, as shown in FIG. d in any one of FIGS. 5 to 7, the second direction 12 and the first direction f1 are parallel to each other, and the first actuator units CH may also be located at the side of the second actuator units CL away from the edge of the cover plate 12.

In some embodiments, as shown in FIG. a, FIG. b, FIG. c or FIG. e in any one of FIGS. 5 to 7, the second direction 12 and the first direction f1 are intersected with each other.

Further, as shown in FIG. a, FIG. b, FIG. c or FIG. e in any one of FIGS. 5 to 7, the second direction f2 and the first direction f1 are perpendicular to each other.

Further, as shown in FIG. a, FIG. b, FIG. c or FIG. e in FIG. 5, the third edges s3 may, for example, be perpendicular to the fourth edges s4.

Exemplarily, as shown in FIG. a, FIG. b, FIG. c or FIG. e in any one of FIGS. 5 to 7, the shape of the display surface Sd is rectangular, the first direction f1 is parallel to the shorter sides of the rectangle, the second direction f2 is parallel to the longer sides of the rectangle, the two third edges s3 are the pair of longer sides of the rectangle, and the two fourth edges s4 are the pair of shorter sides of the rectangle. Certainly, it may also be configured that the first direction f1 is parallel to the longer sides of the rectangle, the second direction f2 is parallel to the shorter sides of the rectangle, the two third edges s3 are the pair of shorter sides of the rectangle, and the two fourth edges s4 are the pair of longer sides of the rectangle.

In some embodiments, as shown in any one of FIGS. 5 to 7, the plurality of actuators 13 located in each of the first actuator units CH are arranged equidistantly with a first spacing d1 in the direction parallel to the third edges $3.

In some embodiments, as shown in any one of FIGS. 5 to 7, the plurality of actuators 13 located in each of the second actuator units CL are arranged equidistantly with a second spacing d2 in the direction parallel to the fourth edges s4.

As shown in FIG. d or FIG. f in any one of FIGS. 5 to 7, when the second direction f2 and the first direction f1 are parallel to each other, the direction of the arrangement of the plurality of actuators 13 located in each of the first actuator units CH and the direction of the arrangement of the plurality of actuators 13 located in each of the second actuator units CL are parallel to each other.

As shown in FIG. d in any one of FIGS. 5 to 7, the shape of the display surface Sd is rectangular, both of the first direction f1 and the second direction f2 are parallel to the shorter sides of the rectangle, the two third edges s3 and the two fourth edges s4 are the pair of longer sides of the rectangle, the plurality of actuators 13 located in each of the first actuator units CH are arranged in the direction of the longer sides, and the plurality of actuators 13 located in each of the second actuator units CL are arranged in the direction of the longer sides.

As shown in FIG. a, FIG. b, FIG. c or FIG. e in any one of FIGS. 5 to 7, when the second direction f2 and the first direction f1 are perpendicular to each other, the direction of the arrangement of the plurality of actuators 13 located in each of the first actuator units CH and the direction of the arrangement of the plurality of actuators 13 located in each of the second actuator units CL are perpendicular to each other.

As shown in FIG. a, FIG. b, FIG. c or FIG. e in any one of FIGS. 5 to 7, the shape of the display surface Sd is rectangular, the first direction f1 is parallel to the shorter sides of the rectangle, the second direction f2 is parallel to the longer sides of the rectangle, the two third edges s3 are a pair of longer sides of the rectangle, the two fourth edges s4 are the pair of shorter sides of the rectangle, the plurality of actuators 13 located in each of the first actuator units CH are arranged in the direction of the longer sides, and the plurality of actuators 13 located in each of the second actuator units CL are arranged in the direction of the shorter sides.

In some embodiments, as shown in any one of FIGS. 5 to 7, the first spacing d1 is less than the second spacing d2.

For the low-frequency driving signal, because the wavelength of the mechanical wave formed by the low-frequency vibration of the actuators 13 is greater than the dimension of the touch display panel 11, the particular numerical value of the second spacing d2 is not limited in the present disclosure. For the high-frequency signal, because the mechanical wave formed by the high-frequency vibration of the actuators 13 has a lower wavelength, thus by configuring the first spacing d1 to be a lower numerical value, it can be ensured that the neighboring actuators 13 in the first actuator units CH can form regular mechanical-vibration interference fringes in the first direction f1, as shown in FIG. 9.

Figure 9:
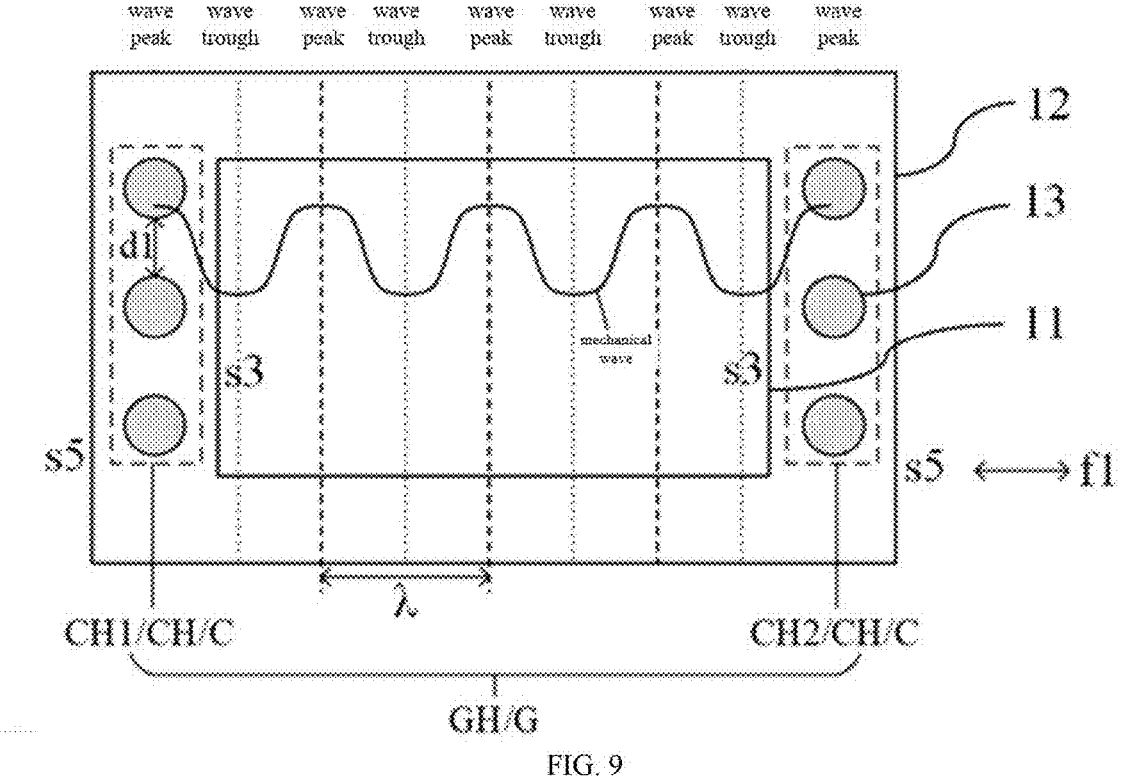
FIG. 9 exemplarily shows a mechanical vibration interference formed at a high-frequency vibration.

In order to form the regular mechanical-vibration interference fringes, in some embodiments, the first spacing d1 is less than or equal to a first wavelength $\lambda$, wherein the first wavelength $\lambda$ refers to the wavelength of the mechanical wave formed by the vibration that the actuators 13 located in the first actuator units CH drive the cover plate 12 to perform, as shown in FIG. 9.

Further, the first spacing d1 is less than or equal to a half of the first wavelength λ.

In particular implementations, the first spacing d1 should be as low as possible, thereby the effect of more delicate tactile sense is generated.

Exemplarily, as shown in FIG. 9, the mechanical wave formed by the vibration that the actuators 13 located in the first actuator units CH drive the cover plate 12 to perform is a Lamb wave.

In order to realize the effect of squeezed-air film, exemplarily, a half of the first wavelength λ may be less than or equal to the width of a finger, wherein the width of a finger is, for example, 10 mm-15 mm.

Exemplarily, the first wavelength λ is in direct proportion to the dimension in the first direction f1 of the cover plate 12. For example, the first wavelength λ is a positive integer times the dimension in the first direction f1 of the cover plate 12.

Exemplarily, the actuators 13 located in each of the first actuator units CH may be of an integral continuous structure. For example, the actuators 13 located in each of the first actuator units CH may be an integral strip-shaped actuator 13 extending along the third edge s3.

It should be noted that the first spacing d1 may also be greater than or equal to the second spacing d2, which is not limited in the present disclosure.

In some embodiments, the dimension in the first direction f1 of each of the actuators 13 is greater than or equal to one eighth of the first wavelength λ, and less than or equal to a half of the first wavelength λ, wherein the first wavelength λ refers to the wavelength of the mechanical wave formed by the vibration that the actuators 13 located in the first actuator units CH drive the cover plate 12 to perform, as shown in FIG. 9.

Because the mechanical wave formed by the high-frequency vibration of the actuators 13 propagates in the first direction f1, and the mechanical wave formed by the high-frequency vibration of the actuators 13 has a lower wavelength, a too large dimension in the first direction f1 of the actuators 13 may hinder the deformation of the cover plate 12 due to the rigidity of the actuators 13. In the present embodiment, by configuring that the dimension in the first direction f1 of the actuators 13 is in the above-described range, the regular mechanical-vibration interference fringes is facilitated to be formed.

The actuators 13 in the present embodiment may be the actuators 13 located in the first actuator units CH, and may also be the actuators 13 located in the second actuator units CL.

Exemplarily, as shown in any one of FIGS. 5 to 7, the first direction f1 is a vertical direction. In other words, a length in the vertical direction of each of the actuators 13 is greater than or equal to one eighth of the first wavelength λ, and less than or equal to a half of the first wavelength λ.

Exemplarily, as shown in FIG. 9, the first direction f1 is the horizontal direction. In other words, a width in the horizontal direction of each of the actuators 13 is greater than or equal to one eighth of the first wavelength λ, and less than or equal to a half of the first wavelength λ.

In some embodiments, as shown in FIG. 9, the actuators 13 are located at the positions of the wave peaks (as shown in FIG. 9) or the wave troughs of a first mechanical wave, wherein the first mechanical wave refers to the mechanical wave formed by the vibration that the actuators 13 located in the first actuator units CH drive the cover plate 12 to perform.

The actuators 13 in the present embodiment may be the actuators 13 located in the first actuator units CH (as shown in FIG. 9), and may also be the actuators 13 located in the second actuator units CL.

The present embodiment, by disposing the actuators 13 at the positions avoiding the wave nodes, the amplitude of the vibration of the first mechanical wave is facilitated to be increased.

In some embodiments, as shown in any one of FIGS. 5 to 7, the cover plate 12 includes two fifth edges s5 adjacent to the two third edges s3, and the two fifth edges s5 are parallel to each other.

Exemplarily, as shown in any one of FIGS. 5 to 7, the upper side and the lower side of the rectangular display surface Sd are the two third edges s3, and the upper side and the lower side of the cover plate 12 are the two fifth edges s5 parallel to each other.

Exemplarily, as shown in any one of FIGS. 5 to 7, the distance between the two fifth edges s5 is substantially the same at the different positions. Further, the fifth edges s5 may be parallel to the third edges s3.

In the present embodiment, the two fifth edges s5 parallel to each other are two regular sides of the cover plate 12. The fifth edges s5 are adjacent to the third edges s3, and the first actuator group GH is adjacent to the third edges s3. Therefore, the first actuator group GH is adjacent to the fifth edges s5. By disposing the first actuator group GH adjacent to the regular fifth edges s5, the regular high-frequency mechanical-vibration interference fringes that is facilitated to be formed, thereby a better effect of the tactile feedback is realized.

In some embodiments, as shown in FIGS. 5 to 7, the cover plate 12 includes two sixth edges s6 adjacent to the two fourth edges s4, and the two sixth edges s6 are parallel to each other or intersected with each other.

Exemplarily, as shown in FIG. a, FIG. b, FIG. c or FIG. e in FIG. 5, the left side and the right side of the rectangular display surface Sd are the two fourth edges s4, and the left side and the right side of the rectangular cover plate 12 are the two sixth edges s6 parallel to each other.

Exemplarily, as shown in FIG. d or FIG. f in any one of FIGS. 5 to 7, the upper side and the lower side of the rectangular display surface Sd are the two fourth edges s4, and the upper side and the lower side of the cover plate 12 are the two sixth edges s6 parallel to each other.

Exemplarily, as shown in FIG. a, FIG. b, FIG. c or FIG. e in FIG. 6, the left side and the right side of the rectangular display surface Sd are the two fourth edges s4, and the left side and the right side of the hyperbolic cover plate 12 are the two sixth edges s6 intersecting with each other.

Exemplarily, as shown in FIG. a, FIG. b, FIG. c or FIG. e in FIG. 7, the left side and the right side of the rectangular display surface Sd are the two fourth edges s4, and the left side and the right side of the trapezoidal cover plate 12 are the two sixth edges s6 intersecting with each other.

When the two sixth edges s6 are parallel to each other, the distance between the two sixth edges s6 is substantially the same at the different positions. Further, the sixth edges s6 and the fourth edges s4 may be parallel to each other.

When the two sixth edges s6 are intersected with each other, the distances between the two sixth edges s6 are unequal at at least two positions. Further, the sixth edges s6 and the fourth edges s4 may be intersected with each other.

In the present embodiment, the two sixth edges s6 parallel to each other are two regular sides of the cover plate 12, and the second actuator group GL may be adjacent to the fourth edges s4 and the regular sixth edges s6. The two sixth edges s6 intersecting with each other are two irregular sides of the cover plate 12, the sixth edges s6 are adjacent to the fourth edges s4, and the second actuator group GL is adjacent to the fourth edges s4 and the sixth edges s6. By disposing the second actuator group GL adjacent to the irregular sixth edges s6, a normal low-frequency vibration can be ensured and the edge room can be sufficiently utilized. If the first actuator group GH is adjacent to the irregular sixth edges s6, it is very difficult to form regular high-frequency mechanical-vibration interference fringes.

It should be noted that, as shown in FIG. d or FIG. f in any one of FIGS. 5 to 7, the third edges s3 and the fourth edges s4 are the same. Correspondingly, the fifth edges s5 and the sixth edges s6 are the same.

Figure 8:
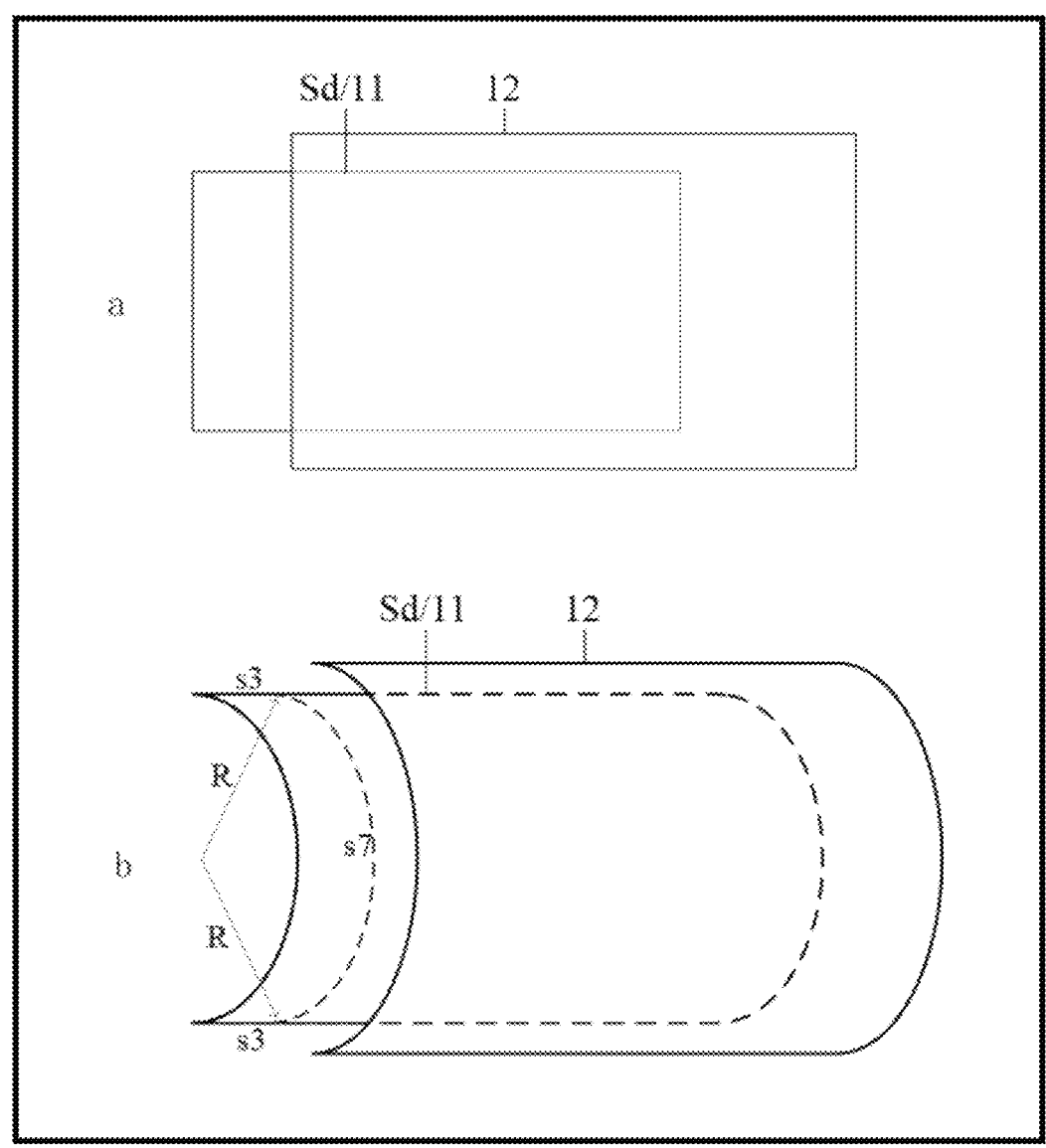
FIG. 8 exemplarily shows schematic structural diagrams of two types of the touch display panel and the cover plate.

In some embodiments, as shown in FIG. b in FIG. 8, the touch display panel 11 includes a flexible display panel, the display surface Sd of the flexible display panel is a curved surface, and the third edges s3 are perpendicular to the curved arc line s7 of the curved surface.

The curved arc line s7 may be a section of circular arc with the curving radius R as the radius.

In the present embodiment, because the third edges s3 are perpendicular to the curved arc line s7 of the curved surface, by disposing the first actuator group GH adjacent to the third edges s3, the regular high-frequency mechanical-vibration interference fringes are facilitated to be formed, thereby a better effect of the tactile feedback is realized.

In some embodiments, as shown in any one of FIGS. 5 to 7, the two second actuator units CL located in the same second actuator group GL include a second actuator unit CL1 and a second actuator unit CL2.

In an example, the vibration waveform generated by the actuators 13 located in the second actuator unit CL1 and the vibration waveform generated by the actuators 13 located in the second actuator unit CL2 have the same phase.

In the present example, the driving signals of the same phase may be supplied to the actuators 13 in the second actuator unit CL1 and the actuators 13 in the second actuator unit CL2, so that the actuators 13 in the second actuator unit CL1 and the actuators 13 in the second actuator unit CL2 generate the vibration waveforms of the same phase.

Figure 10:
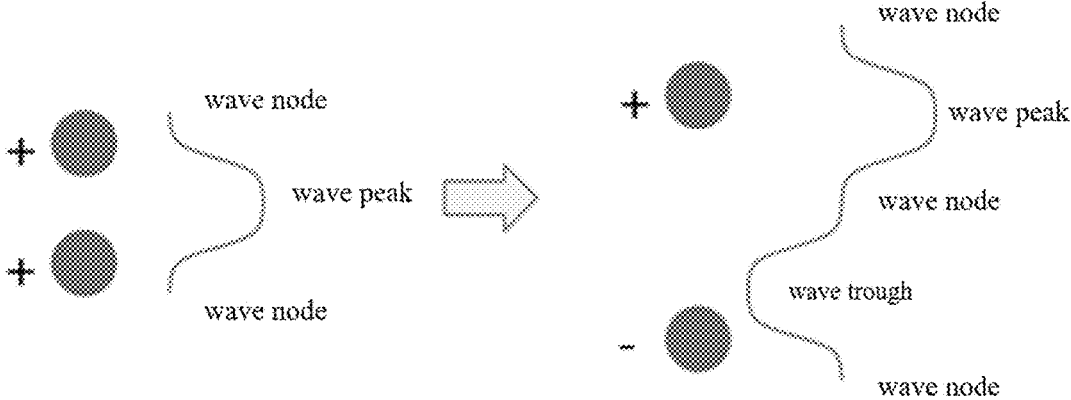
FIG. 10 exemplarily shows a schematic waveform diagram obtained by the superposition of two vibration waveforms.

Because the resonant waveform of the low-frequency vibration is a single-order resonant mechanical wave, the waveform obtained by the superposition of two vibration waveforms of the same phase is shown by the left figure in FIG. 10, wherein the two sides are the nodes, and the wave peak/wave trough is in the middle. The vibration is the most intensive at the positions of the wave peaks, the vibration is weaker at the positions of the nodes, and the resonance frequency might not be in the range of the frequency interval of 100 Hz-500 Hz where the human body has the most intensive tactile sense.

In another example, the vibration waveform generated by the actuators 13 located in the second actuator unit CL1 and the vibration waveform generated by the actuators 13 located in the second actuator unit CL2 have opposite phases.

In the present example, the driving signals of opposite phases may be supplied to the actuators 13 in the second actuator unit CL1 and the actuators 13 in the second actuator unit CL2, so that the actuators 13 in the second actuator unit CL1 and the actuators 13 in the second actuator unit CL2 generate the vibration waveforms of opposite phases.

In this way, the waveform obtained by the superposition of two vibration waveforms of opposite phases is shown by the right figure in FIG. 10, wherein three wave nodes appear, and the wave peak/wave trough is between each two wave nodes, thereby two wave-peak/wave-trough areas of relatively large amplitudes are formed, the range of the region of a large vibration can be increased, and the resonance frequency is adjusted to the range of the frequency interval of 100 Hz-500 Hz where the human body has the most intensive tactile sense.

In some embodiments, as shown in FIG. d or FIG. f in any one of FIGS. 5 to 7, the touch display panel 11 includes a pair of longer sides and a pair of shorter sides, and the two fourth edges s4 are the pair of longer sides of the touch display panel 11. In this way, the distance between the two second actuator units CL can be reduced, so that the effect of the reverse excitation of the two second actuator units CL is more obvious.

In some embodiments, as shown in FIG. b in FIG. 8, the touch display panel 11 includes a flexible display panel, the display surface Sd of the flexible display panel is a curved surface, and the curved surface has a curved arc line s7 with a curving radius of R; and the dimension in the direction of the curved arc line s7 of each of the actuators 13 is greater than or equal to R/60, and less than or equal to R/20.

In this way, an adhesion gap caused by a too large dimension in the direction along the curved arc line s7 of the actuators 13 can be prevented, and loose adhesion caused by a too small dimension in the direction along the curved arc line s7 of the actuators 13 can also be prevented, the reliability of the tactile-feedback module is facilitated to be improved.

Exemplarily, as shown in any one of FIGS. 5 to 7, the direction of the curved arc line s7 is parallel to the first direction f1, i.e., the vertical direction. Accordingly, a length in the vertical direction of each of the actuators 13 is greater than or equal to R/60, and less than or equal to R/20.

Exemplarily, as shown in FIG. b in any one of FIGS. 5 to 7, the direction of the curved arc line s7 is parallel to the second direction f2, i.e., the horizontal direction. Accordingly, a width in the horizontal direction of each of the actuators 13 is greater than or equal to R/60, and less than or equal to R/20.

The actuators 13 according to the present disclosure, unless particularly stated otherwise, may be the actuators 13 located in the first actuator units CH, and may also be the actuators 13 located in the second actuator units CL.

In some embodiments, the touch display panel 11 includes a flexible display panel. The flexible display panel may be of a plane or a curved surface, which is not limited in the present disclosure.

In some embodiments, as shown in FIG. a in FIG. 8, the touch display panel 11 includes a flexible display panel, the display surface Sd of the flexible display panel is a plane, and the surface of the cover plate 12 close to the flexible display panel is a plane parallel to the display surface Sd.

In some embodiments, as shown in FIG. b in FIG. 8, the touch display panel 11 includes a flexible display panel, the display surface Sd of the flexible display panel is a curved surface, and the surface of the cover plate 12 close to the flexible display panel is a curved surface parallel to the display surface Sd.

In some embodiments, the actuators 13 are rigidly connected to the touch display panel 11 or the cover plate 12. In this way, it may be ensured that the actuators 13 can drive the touch display panel 11 or the cover plate 12 to vibrate together, without generating too much vibration attenuation at the connection.

Certainly, the actuators 13 may also be flexibly connected to the touch display panel 11 or the cover plate 12, which is not limited in the present disclosure.

Exemplarily, the rigid connection may include adhesive bonding using a hard adhesive such as an epoxy-resin adhesive, may also include connection by metal welding, may also include connection using a mechanical connector such as a screw, and so on.

Exemplarily, the flexibly connection may include bonding using a soft adhesive, and the soft adhesive may, for example, use a flexible adhesive tape such as a double-sided adhesive tape, a very high bond (VHB) adhesive tape (polyacrylate double-sided foamed-plastic adhesive tape) and silica gel, and may also use a liquid adhesive such as a polyurethane glue, which is not limited in the present disclosure.

In some embodiments, the touch display panel 11 is rigidly connected to the cover plate 12. In this way, it can be ensured that the touch display panel 11 and the cover plate 12 vibrate together, without generating too much vibration attenuation at the connection.

Exemplarily, the actuators 13 are devices that operate by utilizing the inverse piezoelectric effect of a piezoelectric material. The converse effect of the "direct piezoelectric effect", i.e., that a dielectric has elastic deformation under the driving by an electric signal, is referred to as the "inverse piezoelectric effect".

In some embodiments, the actuators 13 include at least one of a PZT piezoelectric thin film, a monolithic piezoelectric ceramic, a stacked piezoelectric ceramic, a cymbal piezoelectric ceramic, a monolithic polyvinylidene fluoride film, a stacked polyvinylidene fluoride film, a cymbal polyvinylidene fluoride film and a linear motor.

Exemplarily, the shape of the actuators 13 may be circular and elongate, and may also be a cymbal shape, which is not limited in the present disclosure.

As compared with the monolithic structures, the actuators 13 of the stacking structure and the cymbal structure have the characteristics of low-voltage driving, a more intensive vibration sense and a higher displacement, and are more suitable to realize the effect of tactile feedback in the tactile-feedback modules of a large size and a high mass.

Exemplarily, the actuators 13 include a piezoelectric ceramic, a row of the actuators 13 are arranged sequentially along one edge of the touch display panel 11. For the touch display panel 11 smaller or equal to 10 cuns, the quantity of the actuators 13 of one row may be 2-5. For the touch display panel 11 larger than or equal to 10 cuns and smaller or equal to 20 cuns, the quantity of the actuators 13 of one row may be 6-12. For the touch display panel 11 larger than or equal to 20 cuns, the quantity of the actuators 13 of one row may be 10-20. It should be noted that the quantity of the actuators 13 of one row is related to the required effect of tactile feedback, the size and the weight of the screen, and the type of the actuators 13, and the particular quantity may be set according to practical demands, and is not limited in the present disclosure.

A tactile-feedback device is further provided by the present disclosure. Referring to FIG. 12, the tactile-feedback device includes: the tactile-feedback module 121 according to any one of the above embodiments; and a driving component 122, wherein the driving component 122 is connected to the touch display panel 11 and the actuators 13, and being configured to drive the touch display panel 11 to display a frame, and according to touch information on the touch display panel 11 of a touch body, output a driving signal to the actuators 13, so that the actuators 13, in response to the driving signal, drive the cover plate 12 to vibrate, to generate tactile feedback at the surface of the cover plate 12 away from the touch display panel 11, i.e., the touch surface St. The touch information includes at least one of a touch position, a touch time and a touch action.

A person skilled in the art can understand that the tactile-feedback device provided by the present disclosure has the advantages of the above-described tactile-feedback module. The tactile-feedback device provided by the present disclosure may be integrated into the products such as a notebook computer and a display, and may serve as the display screen in many fields such as onboard display and consumer electronics, to provide to the user a rich and lifelike tactile experience.

As shown in FIG. 12, the driving component 122 drives the touch display panel 11 to display an interaction frame. When the touch body performs a touch operation on the touch display panel 11, the touch display panel 11 may detect the touch information. The driving component 122, according to the detected touch information, generates a driving signal. The driving signal is used to drive the actuators 13 to drive the cover plate 12 to vibrate, to generate the effect of tactile feedback on the touch surface St. According to the tactile feedback, the operator can confirm whether bis operation is correct and whether the effect that he wants can be reached.

Exemplarily, the driving component 122 may be a vehicle machine system or a PC upper computer.

Exemplarily, the driving component 122 may, according to the detected touch information, firstly determine whether it is required to trigger the tactile feedback, and if yes, then the driving signal is generated.

In some embodiments, the plurality of actuators 13 are connected in parallel to the driving component, so that the driving component is capable of independently driving each of the actuators 13.

Exemplarily, the touch display panel 11 may include a touch circuit and a display panel. The touch circuit may be integrated inside the display panel, and may also be disposed independently from the display panel; for example, the touch circuit is adhered between the display panel and the cover plate 12.

The touch circuit is configured to detect the touch information on the touch display panel 11 of the touch body. The touch information may include one or more of a touch position, a touch time and a touch action. The touch action may, for example, be an operating gesture of a finger, for example, point-and-click, sliding, and sliding trajectory.

In some embodiments, the touch circuit may be a capacitor-type touch circuit or a resistor-type touch circuit, which is not limited in the present disclosure.

For the capacitor-type touch circuit, when the touch body, for example, a finger of the user, touches the touch display panel 11, the touch capacitances at the touch positions of the touch driving electrode and the touch sensing electrode in the touch circuit change, the touch traces in the touch circuit can send the touch capacitances at the positions to the driving component 122, and the driving component 122, according to the touch capacitances at the positions, can determine the touch positions.

In some embodiments, the driving component 122 may include a controller and a driver. Exemplarily, when the touch body is applying a touch operation to the touch display panel 11, the controller, in response to the touch operation, according to the touch information detected by the touch display panel 11, outputs to the driver a driving signal in the form of a digital signal. The driver, after performing digital-to-analogue conversion to the driving signal in the form of a digital signal, generates a driving signal in the form of an analog signal and sends the driving signal to the actuators 13. The actuators 13 vibrate under the driving by the driving signal, thereby the touch display panel 11 is driven to vibrate, to form the tactile feedback.

Exemplarily, the controller may, for example, include at least one of a microcontroller unit (MCU) and a field programmable gate array (FPGA), which is not limited in the present embodiment.

Exemplarily, when the tactile-feedback device is applied in a terminal, the driving component 122 may be the processor of the terminal.

In some embodiments, as shown in FIG. 12, the tactile-feedback device may further include an amplifying circuit 123, wherein the amplifying circuit 123 is connected to the driving component 122 and the actuators 13, and is configured to amplify the driving signal outputted by the driving component 122, and sending the amplified signal to the actuators 13.

In some embodiments, the display panel is a self-luminous display panel, there is a built-in light emitting device disposed in the self-luminous display panel, and the light emitting device may, for example, be an organic light emitting diode (OLED), a quantum-dot light emitting diode (QLED), a mini light emitting diode (Mini LED), a micro light emitting diode (Micro LED) and so on.

A driving method of a tactile-feedback module is further provided by the present disclosure, applied to the tactile-feedback module shown in any one of FIGS. 5 to 7, wherein the driving method includes:

Step S01: applying driving signals of the same phase to the actuators 13 of the two second actuator units CL located in the same second actuator group GL, so that the actuators 13 of the two second actuator units CL located in the same second actuator group GL generate vibration waveforms of the same phase; or applying driving signals of opposite phases to actuators 13 of the two second actuator units CL located in the same second actuator group GL, so that the actuators 13 of the two second actuator units CL located in the same second actuator group GL generate vibration waveforms of opposite phases.

Exemplarily, as shown in any one of FIGS. 5 to 7, the two second actuator units CL located in the same second actuator group GL include a second actuator unit CL1 and a second actuator unit CL2.

In an example, the driving signals of the same phase are applied to the actuators 13 located in the second actuator unit CL1 and the actuators 13 located in the second actuator unit CL2, so that the vibration waveform generated by the actuators 13 located in the second actuator unit CL1 and the vibration waveform generated by the actuators 13 located in the second actuator unit CL2 have the same phase.

Because the resonant waveform of the low-frequency vibration is a single-order resonant mechanical wave, the waveform obtained by the superposition of two vibration waveforms of the same phase is shown in the left figure in FIG. 10, wherein the two sides are the nodes, and the wave peak/wave trough is in the middle. The vibration is the most intensive at the positions of the wave peaks, the vibration is weaker at the positions of the nodes, and the resonance frequency might not be in the range of the frequency interval of 100 Hz-500 Hz where the human body has the most intensive tactile sense.

In another example, the driving signals of opposite phases are applied to the actuators 13 located in the second actuator unit CL1 and the actuators 13 located in the second actuator unit CL2, so that the vibration waveform generated by the actuators 13 located in the second actuator unit CL1 and the vibration waveform generated by the actuators 13 located in the second actuator unit CL2 have opposite phases.

In this way, the waveform obtained by the superposition of two vibration waveforms of opposite phases is shown in the right figure in FIG. 10, wherein three wave nodes appear, and the wave peak/wave trough is between each two wave nodes, thereby two wave-peak/wave-trough areas of relatively large amplitudes are formed, the area of the region of a large vibration can be increased, and the resonance frequency is adjusted to the range of the frequency interval of 100 Hz-500 Hz where the human body has the most intensive tactile sense.

In some embodiments, as shown in FIG. d or FIG. f in any one of FIGS. 5 to 7, the touch display panel 11 includes a pair of longer sides and a pair of shorter sides, and the two fourth edges s4 are the pair of longer sides of the touch display panel 11.

Because the second actuator units CL are adjacent to the fourth edges s4, by configuring that the two fourth edges s4 are the pair of longer sides, the distance between the two second actuator units CL can be reduced, so that the effect of the reverse excitation of the two second actuator units CL is more obvious.

In the present disclosure, the meaning of "plurality of" is "two or more", and the meaning of "at least one" is "one or more", unless explicitly and particularly defined otherwise.

In the present disclosure, the terms that indicate orientation or position relations, such as "upper" and "lower", are based on the orientation or position relations shown in the drawings, and are merely for conveniently describing the present disclosure and simplifying the description, rather than indicating or implying that the device or element must have the specific orientation and be constructed and operated according to the specific orientation. Therefore, they should not be construed as a limitation on the present disclosure.

In the present text, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "including a . . . " does not exclude additional same element in the process, method, article or device including the element.

The "one embodiment", "some embodiments", "exemplary embodiments", "one or more embodiments", "example", "one example" or "some examples" as used herein are intended to indicate that specific features, structures, materials or characteristics related to the embodiment or example are included in at least one embodiment or example of the present disclosure. The illustrative indication of the above terms does not necessarily refer to the same embodiment or example. Moreover, the specific features, structures, materials or characteristics may be included in any one or more embodiments or examples in any suitable manner.

In the present text, relation terms such as first and second are merely intended to distinguish one entity or operation from another entity or operation, and that does not necessarily require or imply that those entities or operations have therebetween any such actual relation or order.

In the description on some embodiments, "couple" and "connect" may be used. For example, in the description on some embodiments, the term "connect" may be used to indicate that two or more components directly physically contact or electrically contact each other. As another example, in the description on some embodiments, the term "couple" may be used to indicate that two or more components directly physically contact or electrically contact each other. However, the term "couple" or "communicatively couple" may also indicate that two or more components do not directly contact each other, but still cooperate with each other or act on each other. The embodiments disclosed herein are not necessarily limited by the contents herein.

"At least one of A, B and C" and "at least one of A, B or C" have the same meaning, and both of them include the following combinations of A, B and C: solely A, solely B, solely C, the combination of A and B, the combination of A and C, the combination of B and C, and the combination of A, B and C.

"A and/or B" include the following three combinations: solely A, solely B, and the combination of A and B.

As used herein, with reference to the context, the term "if" is optionally interpreted as meaning "when" or "in response to determining that" or "in response to detecting that". Similarly, with reference to the context, the phrase "if it has been determined that" or "if the stated condition or event has been detected" is optionally interpreted as referring to "when it has been determined that" or "in response to determining . . . " or "when the stated condition or event has been detected" or "in response to the stated condition or event having been detected".

The "for" or "configured to" as used herein is intended as opened and inclusive languages, and does not exclude apparatuses adapted for or configured to execute additional tasks or steps.

The "based on" or "according to" as used herein means opening and inclusive. The processes, steps, calculations or other actions based on one or more conditions or values may be based on other conditions or exceed the values in practice. The processes, steps, calculations or other actions according to one or more conditions or values may be according to other conditions or exceed the values in practice.

As used herein, "about", "substantially" or "approximately" includes the described value and the average value within an acceptable deviation range of the particular value, wherein the acceptable deviation range is decided by the discussed measurement that a person skilled in the art has taken into consideration and the error relevant to the measurement on the specific quantity (i.e., the limitation of the measuring system).

As used herein, "parallel", "perpendicular", "equal" and "flushing" include the described case and cases similar to the described case, wherein the range of the similar cases is within an acceptable deviation range, wherein the acceptable deviation range is decided by the discussed measurement that a person skilled in the art has taken into consideration and the error relevant to the measurement on the specific quantity (i.e., the limitation of the measuring system). For example, "parallel" includes absolute parallelism and approximate parallelism, wherein the acceptable deviation range of the approximate parallelism may, for example, be deviations within 5°, "Perpendicular" includes absolute perpendicularity and approximate perpendicularity, wherein the acceptable deviation range of the approximate perpendicularity may also, for example, be deviations within 5°. "Equal" includes absolute equality and approximate equality, wherein the acceptable deviation range of the approximate equality may, for example, be that the difference between the two equal instances is less than or equal to 5% of any one of them.

"Flushing" includes absolute flushing and approximate flushing, wherein the acceptable deviation range of the approximate flushing may, for example, be that the distance between the two flushing instances is less than or equal to 5% of the dimension of any one of them.

It should be understood that, when a layer or element is described as on another layer or a base board, the layer or element may be directly on another layer or the base board, or an intermediate layer may also exist between the layer or element and the another layer or the base board.

The exemplary embodiments are described herein with reference to sectional views and/or plan views as idealized illustrative figures. In the drawings, in order for clarity, the thicknesses of the layers and the regions are exaggerated. Therefore, alterations from the shapes of the figures as the result of, for example, fabricating techniques and/or tolerances can be envisaged. Therefore, the exemplary embodiments should not be interpreted as limited to the shapes of the regions shown herein, but should include the shape deviations caused by, for example, fabrication. For example, an etching region illustrated as rectangular generally has a curved feature. Therefore, the regions shown in the drawings are essentially illustrative, and their shapes are not intended to illustrate the practical shapes of the regions of the device, and are not intended to limit the scopes of the exemplary embodiments.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A tactile-feedback module, comprising:
a touch display panel, comprising a display surface;
a cover plate disposed at one side of the touch display panel and adjacent to the display surface; and
a plurality of actuators disposed at a same side of the cover plate as the touch display panel, wherein;
the actuators are configured to, in response to a driving signal, drive the cover plate to vibrate, to generate tactile feedback at a surface of the cover plate away from the touch display panel;
the actuators are adjacent to an edge of the touch display pane;
the touch display panel comprises a flexible display panel, and a display surface of the flexible display panel is a curved surface, and the curved surface has a curved arc line with a curving radius of R; and
a dimension in a direction of the curved arc line of each of the actuators is greater than or equal to R/60, and less than or equal to R/20.

2. The tactile-feedback module according to claim 1, wherein at least one of the plurality of actuators is located at one side of the touch display panel away from the cover plate, and an orthographic projection on the cover plate of the at least one of the plurality of actuators is located within an area of an orthographic projection on the cover plate of the touch display panel.

3. The tactile-feedback module according to claim 1, wherein at least one of the plurality of actuators is located at one side of the cover plate close to the touch display panel, and an orthographic projection on the cover plate of the at least one of the plurality of actuators is located outside an area of an orthographic projection on the cover plate of the touch display panel and inside an edge of the cover plate.

4. The tactile-feedback module according to claim 1, wherein the plurality of actuators are adjacent to a second edge of the touch display panel, and the plurality of actuators adjacent to the second edge are arranged in a direction parallel to the second edge.

5. The tactile-feedback module according to claim 1, wherein the plurality of actuators are divided into at least one actuator group, each actuator group is divided into two actuator units, and each of the actuator units comprises at least one of the plurality of actuators; and the two actuator units located in a same actuator group are close to two different edges that are opposite to each other of the touch display panel, respectively.

6. The tactile-feedback module according to claim 5, wherein the two actuator units located in the same actuator group are arranged symmetrically, and comprise actuators of equal quantities.

7. The tactile-feedback module according to claim 5, wherein the at least one actuator group comprises:

a first actuator group being configured to generate a vibration at a first frequency, wherein the actuator units located in the first actuator group are first actuator units, two first actuator units located in a same first actuator group are adjacent to two third edges of the touch display panel, and the two third edges are opposite to each other in a first direction; and/or a second actuator group being configured to generate a vibration at a second frequency, wherein the actuator units located in the second actuator group are second actuator units, two second actuator units located in a same second actuator group are adjacent to two fourth edges of the touch display panel, and the two fourth edges are opposite to each other in a second direction;

wherein the first frequency is greater than the second frequency, and the second direction and the first direction are parallel to each other or intersected with each other.

8. The tactile-feedback module according to claim 7, wherein the second direction and the first direction are parallel to each other, and the first actuator units are located at one side of the second actuator units close to an edge of the cover plate.

9. The tactile-feedback module according to claim 7, wherein the plurality of actuators located in each of the first actuator units are arranged equidistantly with a first spacing in a direction parallel to the third edges; and the plurality of actuators located in each of the second actuator units are arranged equidistantly with a second spacing in a direction parallel to the fourth edges;

wherein the first spacing is less than or equal to the second spacing.

10. The tactile-feedback module according to claim 9, wherein the first spacing is less than or equal to a first wavelength, wherein the first wavelength refers to a wave-length of a mechanical wave formed by vibration that the actuators located in the first actuator units drive the cover plate to perform.

11. The tactile-feedback module according to claim 7, wherein a dimension in the first direction of each of the actuators is greater than or equal to one eighth of a first wavelength, and less than or equal to a half of the first wavelength, wherein the first wavelength refers to a wave-length of a mechanical wave formed by vibration that the actuators located in the first actuator units drive the cover plate to perform.

12. The tactile-feedback module according to claim 7, wherein the actuators are located at positions of wave peaks or wave troughs of a first mechanical wave, wherein the first mechanical wave refers to a mechanical wave formed by vibration that the actuators located in the first actuator units drive the cover plate to perform.

13. The tactile-feedback module according to claim 7, wherein the cover plate comprises two fifth edges adjacent to the two third edges, and two sixth edges adjacent to the two fourth edges; and the two fifth edges are parallel to each other, and the two sixth edges are parallel to each other or intersected with each other.

14. The tactile-feedback module according to claim 7, wherein the touch display panel comprises a flexible display panel, and a display surface of the flexible display panel is a curved surface, and the third edges are perpendicular to a curved arc line of the curved surface.

15. The tactile-feedback module according to claim 7, wherein the touch display panel comprises a pair of longer sides and a pair of shorter sides, and the two fourth edges are the pair of longer sides of the touch display panel.

16. The tactile-feedback module according to claim 1, wherein the actuators comprise at least one of a lead zirconate titanate (PZT) piezoelectric thin film, a monolithic piezoelectric ceramic, a stacked piezoelectric ceramic, a cymbal piezoelectric ceramic, a monolithic polyvinylidene fluoride film, a stacked polyvinylidene fluoride film, a cymbal polyvinylidene fluoride film and a linear motor.

17. A tactile-feedback device, wherein the tactile-feed-back device comprises:

the tactile-feedback module according to claim 1; and a driving component, wherein the driving component is connected to the touch display panel and the actuators, and is configured to drive the touch display panel to display a frame, and according to touch information on the touch display panel of a touch body, output the driving signal to the actuators, so that the actuators, in response to the driving signal, drive the cover plate to vibrate, to generate the tactile feedback at the surface of the cover plate away from the touch display panel, wherein the touch information comprises at least one of a touch position, a touch time and a touch action.

18. A driving method of a tactile-feedback module, applied to the tactile-feedback module according to claim 7, wherein the driving method comprises:

applying driving signals of a same phase to actuators of the two second actuator units located in the same second actuator group, so that the actuators of the two second actuator units located in the same second actuator group generate vibration waveforms of the same phase; or applying driving signals of opposite phases to actuators of the two second actuator units located in the same second actuator group, so that the actuators of the two second actuator units located in the same second actuator group generate vibration waveforms of opposite phases.

* * * * *